United States Patent
Maler et al.

(10) Patent No.: US 7,987,495 B2
(45) Date of Patent: Jul. 26, 2011

(54) SYSTEM AND METHOD FOR MULTI-CONTEXT POLICY MANAGEMENT

(75) Inventors: Sophia Maler, Southborough, MA (US); Vadim Lander, Newton, MA (US); Andrew Rappaport, Boylston, MA (US)

(73) Assignee: Computer Associates Think, Inc., Islandia, NY (US)

( * ) Notice: Subject to any disclaimer, the term of this patent is extended or adjusted under 35 U.S.C. 154(b) by 880 days.

(21) Appl. No.: 11/964,471

(22) Filed: Dec. 26, 2007

(65) Prior Publication Data
US 2008/0155649 A1 Jun. 26, 2008

Related U.S. Application Data

(60) Provisional application No. 60/871,885, filed on Dec. 26, 2006, provisional application No. 60/871,887, filed on Dec. 26, 2006.

(51) Int. Cl.
*H04L 9/00* (2006.01)
(52) U.S. Cl. ............................................................ 726/1
(58) Field of Classification Search .................. 713/169, 713/171, 168, 182; 726/1, 4, 5, 17–19, 23, 726/27
See application file for complete search history.

(56) References Cited

U.S. PATENT DOCUMENTS

| | | | |
|---|---|---|---|
| 7,188,254 B2 * | 3/2007 | Somin et al. | 713/185 |
| 7,703,126 B2 * | 4/2010 | Khosravi et al. | 726/2 |
| 7,774,824 B2 * | 8/2010 | Ross | 726/2 |
| 2005/0251856 A1 * | 11/2005 | Araujo et al. | 726/12 |
| 2006/0265599 A1 * | 11/2006 | Kanai | 713/182 |

OTHER PUBLICATIONS

Cisco NAC Appliance Data Sheet, copyright 2011 Cisco, C78-562875-03, Mar. 2011, 5 pages.
Cisco NAC Network Module for Integrated Services Routers Data Sheet, copyright 2009 Cisco Systems, Inc., C78-422309-01, Oct. 2009, 7 pages.

* cited by examiner

*Primary Examiner* — Beemnet W Dada
(74) *Attorney, Agent, or Firm* — Pillsbury Winthrop Shaw Pittman LLP

(57) ABSTRACT

The system and method described herein provides multi-context security policy management in a networked computing infrastructure. The system and method may generate a plurality of security contexts regarding different security characteristics of the communication between a computing device and the networked computing infrastructure. The computing device then requests access to at least one specific element of the computing infrastructure. The security policy definitions of the at least one specific element are compared with one or more of the security contexts to determine whether access to the specific elements should be granted.

23 Claims, 2 Drawing Sheets

SYSTEM AND METHOD FOR MULTI-CONTEXT POLICY MANAGEMENT

CROSS REFERENCE TO RELATED APPLICATIONS

This application claims the benefit of U.S. Provisional Patent Application Ser. No. 60/871,885, entitled "System and Method for Multi-Context Policy Management," filed Dec. 26, 2006 and U.S. Provisional Patent Application Ser. No. 60/871,887, entitled "System and Method for Multi-Context Policy Management," filed Dec. 26, 2006, the contents of which are hereby incorporated by reference in their entirety.

FIELD OF THE INVENTION

The invention relates to a system and method for multi-context policy management that shares security information regarding a plurality of security contexts, enabling access determinations based on the shared security information.

BACKGROUND OF THE INVENTION

The proliferation of mobile devices (such as laptop computers and smart phones) that are able to access the computing infrastructure of an enterprise have increased productivity for remote workers. However, this increase in productivity also increases security risk for the enterprise. For example, the mobile device may be more difficult to manage by computing infrastructure administrators and may pose increased security risks such as improperly configured or non-existent anti-virus software running on the mobile device. Furthermore, the network connection used by the mobile device may be less secure. Numerous other risks may also exist. Thus, remote and/or mobile access to computing infrastructures may present substantial security risk. In some instances, computing devices within the computing infrastructure may pose similar risks.

Existing systems may attempt to mitigate risk by using a layered (or contextual) security approach. For example, when a computing device attempts to access the computing infrastructure, existing systems may assess the security posture of the device when determining whether to grant access. The device may then be granted access only when the security posture of the device is deemed sufficiently secure. Elements within the computing infrastructure may have their own security layer such as those that include prompting the user for a username and password.

However, as the relationship among components of networks becomes increasingly complex, existing security systems that are layered and fragmented become increasingly difficult to manage. Furthermore, using a layered approach fails to take advantage of security information from other layers. For example, suppose a sales executive is traveling and has just completed a customer visit. The sales executive wishes to place a large order using a personal digital assistant (PDA). Using the PDA, the sales executive uses a local coffee shop's wireless network to access the computing infrastructure of her company. Once access to the computing infrastructure is granted, the sales executive may access a purchasing application (an element within the computing infrastructure), which prompts the sales executive for a username and password for user authentication. Upon user authentication, the application enables the order to be placed. In this scenario, the coffee shop's wireless network may be unsecured. Although this may not have presented a sufficient security risk to deny access to the computing infrastructure generally, the purchasing application may have more strict requirements. Because the act of placing orders involves invoicing, customer data, or other sensitive data, it may be desirable to allow access only when all security contexts associated with the order are secure. In particular, it may be desirable that the purchasing application require purchases to be made only through secured networks. However, because information regarding the type of network used to access to the computing infrastructure is not retained at the application level, its security layer information cannot be used. Thus, because the application context is separate from the network context, the security information related to each are unavailable to the other using existing systems.

SUMMARY OF THE INVENTION

The invention solves these and other problems in the art by providing systems and methods that recognize that the security posture of a device in complex computing environments should comprise a composite value made up of security values from multiple security contexts. The invention addresses the fact that different elements providing features and functions within these complex computing environments need to consider security attribute data from a range of contexts in order to make appropriate and organizationally beneficial security decisions. As such, the security recognition provided by the invention is composite. Even if a lower level security enforcement point allows access to protected resource (e.g., network, device, and application tiers) the overall security posture may not satisfy the requirements of other possibly, ensuing enforcement points (e.g., a user credential and device pair may be adequate to access a corporate network, but the security posture of the connection or device may not be enough to satisfy the security policies protecting sensitive application resources).

The invention provides a framework and mechanism whereby security context information can be shared between elements of a computing infrastructure. This allows security policy and enforcement mechanism(s) to consume security context information from other elements. From the example above: an application within a computing infrastructure may require that large orders (or other valuable or sensitive actions) by made over a secure connection, whereas a request to view dates of an order (or other less valuable or sensitive action) may be allowed over a less secure connection. The ability to consume normalized security contexts from preceding elements provides a more comprehensive security assessment and results in better and more accurate security policy decisions and enforcement. As complex business transactions comprise multiple computing elements and tiers, each element of may contribute information it has about the security posture to the aggregate security context. This includes information that only each individual element can know.

In some embodiments, the invention provides systems and method for multi-context security policy management in networked computer systems. For example, the invention may share security information regarding a plurality of security contexts relevant to devices attempting to access a computing infrastructure. These multiple security contexts may be shared throughout the computing infrastructure and used to gate access to elements of the computing infrastructure according to security policies of the various elements. The use of multiple security contexts in this manner may, inter alia, improve access control and device configuration in the networked computing infrastructure.

A computing environment in which the systems and method of the invention may operate may include one or more computing devices, a network, a computing infrastructure and/or other elements. In some embodiments, a computing device may be or include any wireless or wired computer-implemented device such as, for example, a desktop computer, a laptop computer a, Personal Digital Assistant (PDA), a cell phone, a smart phone, a handheld computer, and/or other computer-implemented device. In some embodiments, the computing device may access or communicate with the computing infrastructure via the network.

In some embodiments, the computing infrastructure may be or include a computer-implemented infrastructure such as, for example, a networked collection of servers, clients, applications, databases, and/or other information technology infrastructure elements, including hardware and/or software elements. For example, in some embodiments, the computing infrastructure may be or include the information technology infrastructure of an enterprise or other organization.

The computing infrastructure may also include one or more "elements." An element may include one or more servers, databases, applications, or other portions of the computing infrastructure for which separate and distinct access gating is desired. An element of the computing infrastructure may include any grouping of one or more hardware, software, or data elements having separate and distinct access profiles.

In some embodiments, the computing infrastructure may include one or more software modules for supporting one or more of the features and/or functions of the invention such as, for example, receiving requests from computing devices for access to the computing infrastructure, granting the requesting computing devices access to the computing infrastructure, determining or obtaining one or more security attributes, generating normalized security contexts from the one or more security attributes, generating one or more security scores for one or more security contexts, receiving requests to access at least one of the elements of the computing infrastructure, determining or obtaining one or more security policy definitions the elements of the computing infrastructure, determining whether to grant a computing device access to an element of the computing infrastructure based at least one generated security context, granting a computing device access to elements of the computing infrastructure, sending messages to a computing device regarding access an element of computing infrastructure, and/or other features or functions of the invention.

In particular, the one or more modules of the computing infrastructure may include an attribute reception module, a security context module, an access module, an element policy module, a remediation message module, and/or other modules for performing the features and functions of the invention described herein. In some embodiments, one or more of the modules may be combined. For some purposes, not all modules may be necessary. In some embodiments, one or more of the modules providing the features and functions described herein may run on or be supported by one or more servers or other computer-implemented devices operating on the computing infrastructure. In some embodiments, the one or more of modules providing the features or functions described herein may be distributed across various portions of the computing infrastructure as would be appreciated.

In some embodiments, the computing infrastructure may also include a session database for storing information regarding users, computing devices, data connections, elements of the computing infrastructure, security attributes, security contexts, security scores, security profile definitions, and/or other data. In some embodiments, the session database may include any combination of databases or other data storage devices.

In some embodiments, the invention may include a process for multi-context policy management in a computing infrastructure that includes shared security information regarding a plurality of security contexts, wherein access is gated based on the shared security information. In some embodiments, the process of the invention may include a computing device submitting a request to access the computing infrastructure. In some embodiments, an attribute reception module may then request, determine, or otherwise obtain one or more security attributes of the requesting computing device and store these attributes in a session database. In some embodiments, the one or more security attributes may include device-based security attributes, user-based security attributes, connection-based security attributes, and/or other types of security attributes. In some embodiments, device based security attributes, user-based security attributes, and connection-based security attributes may be referred to as "communication-related security attributes" as each of these types of attributes relate to the communication between the computing device and the communication infrastructure or individual elements thereof.

In some embodiments, device-based security attributes may be attributes inherent to the requesting computing device that may be related to one or more potential security threats posed by the computing device to the computing infrastructure or elements thereof. User-based security attributes may include attributes inherent to a user of the requesting computing device that may be relevant to the security of the computing infrastructure or elements thereof. Connection-based security attributes may include attributes inherent to the data connection between the requesting computing device and the computing infrastructure that may be relevant to the security of the computing infrastructure or elements thereof.

A security context module may then use the one or more security attributes to generate one or more security contexts for the requesting computing device and store the contexts in the session database. In some embodiments, a single security context may be generated for each type of security attribute. For example, device-based security attributes may be used to generate a device-based security context, user-based security attributes may be used to generate a user-based security context, and connection-connection based security attributes may be used to generate a connection-based security context. Other security contexts may also be generated using other security attributes. In some embodiments, the one or more security contexts may be normalized, such that they may be consumed or otherwise utilized across the computing infrastructure.

In some embodiments, generating a security context may include generating a security score. The security score may be stored in the session database. In some embodiments, the security score may be an indicator of a relative strength of the overall security posture of the communication between a computing device and the computing infrastructure. In some embodiments, the security score may be based at least in part on the one or more security attributes. In some embodiments, the security score may be generated for each of the plurality of security contexts. For example, the user-based security context, the connection-based security context, the device-based security context, and/or other contexts may each be associated with a security score based on their respective security attributes. Accordingly, the various components of the computing infrastructure, for example, may have access to multiple security scores related to the communication between a given computing device and the communication infrastructure. It should be noted that a security score may be generated for each of the plurality of security contexts based on any other security attributes and/or data. In some embodiments, the security context may comprise the generated security score. In some embodiments, the generated security scores for each of the plurality of security contexts may be aggregated to generate an aggregate security score. The aggregate security score may represent the overall threat level posed by the combination of the plurality of security contexts and access to elements of the computing infrastructure may be gated thereupon. Other methods of representing security scores may be used as would be appreciated by those skilled in the art.

The computing device requesting general access to the computing infrastructure may then either be granted or denied access to the computing infrastructure. In some embodiments, an access module may determine whether the access is granted. In some embodiments, one or more general access policy definitions may be used by the access module to determine whether to grant this general access to computing infrastructure. If the requesting computing device is not granted access to the computing infrastructure, an access denial message may be sent to the requesting computing device. If the requesting computing device is granted access to the computing infrastructure, a data connection between the computing device and the computing infrastructure may be established.

The computing device that is connected to the computing infrastructure may then request access to one or more specific elements of the computing infrastructure. One or more security policy definitions regarding the one or more elements 150 which access has been requested by the computing device may be received, determined, or otherwise obtained by, for example, an element policy module. For example, in some embodiments, the session database or other portion of the computing infrastructure may store and/or manage the individual security policies regarding each of the elements of the computing infrastructure. In some embodiments, these security policies may define specific conditions (e.g., security policy definitions), for access to each element of the computing infrastructure. In some embodiments, the specific conditions may include conditions related to one or more of a plurality of security contexts such as, for example, a device-based security context (i.e., what device-inherent attributes must or must not be present to grant access), a user-based security context (i.e., what user-inherent attributes must or must not be present to grant access), a connection-based security context (i.e., what connection-inherent attributes must or must not be present to grant access), and/or other security contexts.

In some embodiments, the specific conditions may be or include security score requirements. In some embodiments, the security score requirements may specify that each of the one or more security contexts complies with a minimum security score.

In some embodiments, the security policy of each element may specify the "level" of access that is to be granted to each acceptable combination of security context attributes. This may be referred to as the "application-based security context" that is used in granted access. However, unlike the device-based security context, the user-based security context, and the connection-based security context, which are all derived between the communication between a computing device and the computing infrastructure, the application-based security context is derived from the security policies of individual elements of the computing infrastructure. The "level" of access dictated by the application-based security context may refer to the portion or features of an element granted to a computing device during communication with the element.

For example, a given element may grant only partial access to certain users, those using certain types of devices, those connected via certain types of connections, or some combination thereof.

The access module may then compare at least one of the communication-related security contexts to the security policy definitions for the element to determine whether they meet the conditions for access set forth by the security policy of the element. In some embodiments, multiple communication-related security contexts (e.g., two or more of a user based security context, a device-based security context, or a connection-based security context) may be compared to the security policy definitions of an element for the purpose of access gating. The use of multiple contexts in access gating may provide more robust and effective security access management.

If the requirements of the one or more security policy definitions of an element are met, the computing device is granted access to the element. In some embodiments, the level of access granted to the computing device may be granted according to the specific application-based security context associated with the element for the specific combination of communication-related security attributes.

If the conditions are not met, access is denied. In other words, although the computing device may comply with a security policy to grant access to the computing infrastructure, the computing device may not comply with the specific security policy of the element for which access was requested. Accordingly, the one or more elements of the computing infrastructure that deny the request may require an altered security "posture" of the computing device before access may be granted.

In some embodiments, upon denial of access to an element, one or more remediation messages may be sent to the computing device (or a proxy). In some embodiments, the one or more remediation messages may be formulated and/or sent by a remediation module. Remediation messages may comprise messages that notify the computing device to alter its security posture prior to further access requests. In some embodiments, the one or more remediation messages may comprise a message to, for example, update or activate anti-virus protection, resubmit over a secure connection, use more secure authentication method, change networks, and/or other messages. The security posture of the computing device may then be altered according to the instructions of the one or more remediation messages. The security context module may then generate new security contexts according to the one or more altered security attributes. The new security contexts may then be compared to the security policy definitions of one or more elements to which access has been requested. These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION

In some embodiments, the invention provides systems and method for multi-context security policy management in networked computer systems. For example, the invention may share security information regarding a plurality of security contexts relevant to devices attempting to access a computing infrastructure. These multiple security contexts may be shared throughout the computing infrastructure and used to gate access to elements of the computing infrastructure according to security policies of the various elements. The use of multiple security contexts in this manner may, inter alia, improve access control and device configuration in the networked computing infrastructure.

Figure 1:
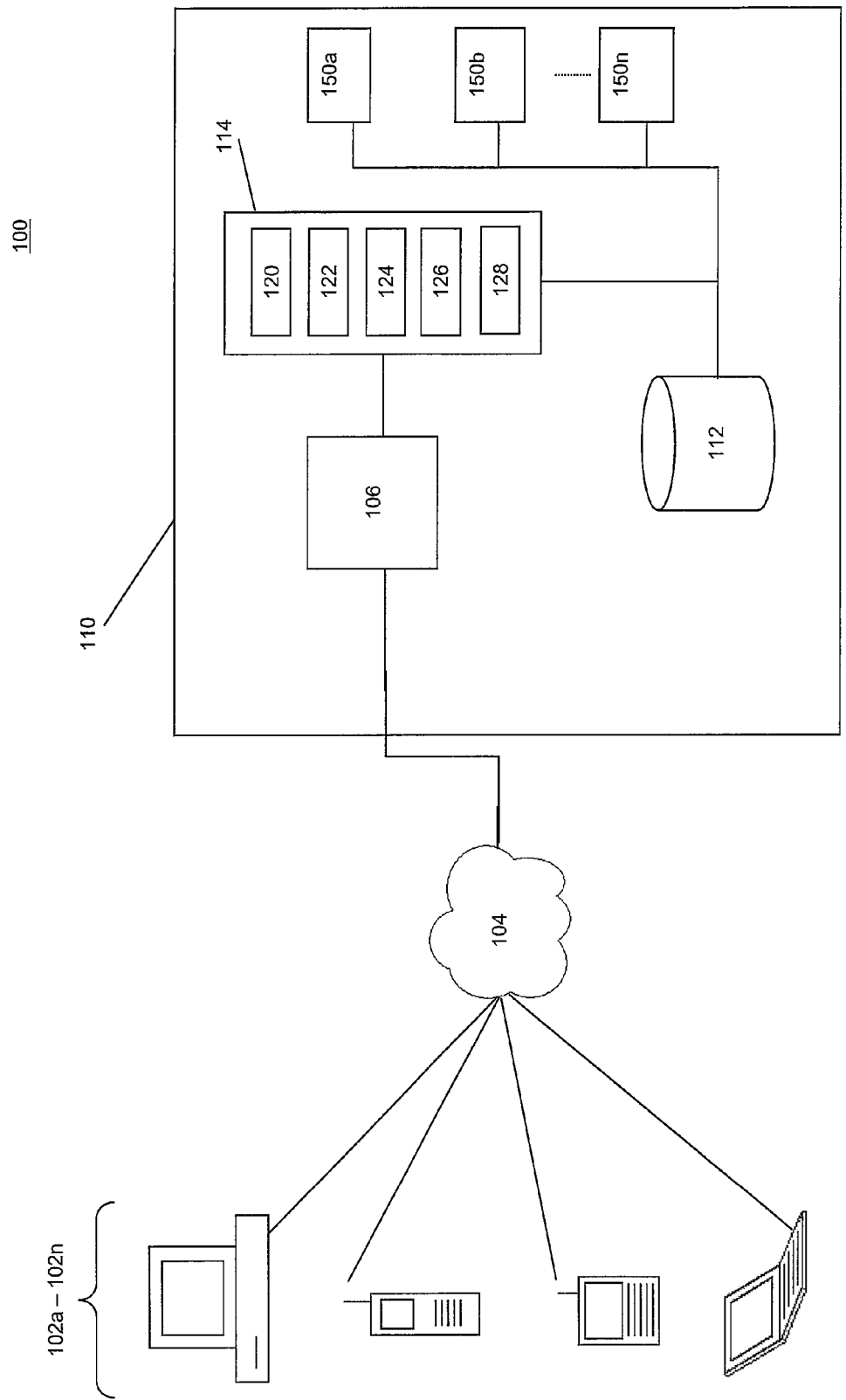
FIG. 1 illustrates an example of a system for providing multi-context policy management according various embodiments of the invention.

FIG. 1 illustrates an example of a computing environment 100 in which a system for providing multi-context policy management according to various embodiments of the invention may exist. In some embodiments, computing environment 100 may include one or more computing devices 102a-02n, a network 104, computing infrastructure 110 and/or other elements. In some embodiments, a system for providing multi-context policy management according to the invention may include various hardware and/or software components residing in computing infrastructure 110, including one or more modules providing the various features or functions described herein. In some embodiments, a system for providing multi-context management according to the invention may include one or more components residing outside of computing infrastructure 110.

In some embodiments, computing device 102 may be or include any wireless or wired computer-implemented device such as, for example, a desktop computer, a laptop computer a, Personal Digital Assistant (PDA), a cell phone, a smart phone, a handheld computer, and/or other computer-implemented device. In some embodiments, computing device 102 may access or communicate with computing infrastructure 110 via network 104. While computing devices 102a-102n are illustrated in FIG. 1 as residing outside of computing infrastructure 110, in some embodiments, a computing device 102 may reside within computing infrastructure 110.

In some embodiments, network 104 may be any one or more of, for instance, the Internet, an intranet, a PAN (Personal Area Network), a LAN (Local Area Network), a WAN (Wide Area Network), a SAN (Storage Area Network), a MAN (Metropolitan Area Network), or any wireless network and associated infrastructure. Any suitable communications link may be utilized, including any one or more of, for instance, a copper telephone line, a Digital Subscriber Line (DSL) connection, a Digital Data Service (DDS) connection, an Ethernet connection, an Integrated Services Digital Network (ISDN) line, wireless connections and associated hardware, an analog modem connection, a cable modem connection, or other connection.

In some embodiments, computing infrastructure 110 may be or include a computer-implemented infrastructure such as, for example, a networked collection of servers, clients, applications, databases, and/or other information technology infrastructure elements, including hardware and/or software elements. For example, in some embodiments, computing infrastructure 110 may be or include the information technology infrastructure of an enterprise or other organization.

In some embodiments, computing infrastructure 110 may include a network access element 106. Network access element 106 may be or include any network communications infrastructure element (whether implemented as hardware and/or software) such as, for example, a router, a virtual private network access point, and/or any other network communications infrastructure element. In some embodiments, network access element 106 may route access from one or more computing devices 102 to computing infrastructure 110 and elements thereof (e.g., elements 150a-150n). While FIG. 1 illustrates a single network access element 106, in some embodiments, multiple network access elements may be used.

Computing infrastructure 110 may also include one or more elements 150a-150n. An element 150 may include one or more servers, databases, applications, or other portions of computing infrastructure 110 for which separate and distinct access gating is desired. For instance, if an enterprise has multiple computing assets in their computing infrastructure, some of which merit higher security profiles than others, access to these assets (e.g., databases of confidential information) may be separately gated so that only those with permission may access them. Other circumstances meriting separate access gating to elements 150a-150n may exist. When discussed herein, an element 150 of computing infrastructure 110 may include any grouping of one or more hardware, software, or data elements having separate and distinct access profiles.

In some embodiments, computing infrastructure 110 may include one or more software modules for supporting one or more of the features and/or functions of the invention such as, for example, receiving requests from computing devices 102 for access to computing infrastructure 110, granting the requesting computing devices 102 access to computing infrastructure 110, determining or obtaining one or more security attributes, generating normalized security contexts from the one or more security attributes, generating one or more security scores for one or more security contexts, receiving requests to access at least one of elements 150a-150n of computing infrastructure 110, determining or obtaining one or more security policy definitions for at least one of elements 150a-150n of computing infrastructure 110, determining whether to grant a computing device 102 access to at least one of elements 150a-150n based at least one generated security context, granting a computing device 102 access to at least one of elements 150a-150n, sending messages to a computing device 102 regarding access to at least one element 150, and/or other features or functions of the invention.

In particular, the one or more modules of computing infrastructure 110 may include attribute reception module 120, a security context module 122, an access module 124, an element policy module 126, a remediation message module 128, and/or other modules for performing the features and functions of the invention described herein. In some embodiments, one or more of the modules may be combined. For some purposes, not all modules may be necessary. In some embodiments, one or more of modules 120-128 or other modules providing the features and functions described herein may run on or be supported by a server 114 operating on computing infrastructure 110. In some embodiments, one or more of modules 120-128 or other modules providing the features or functions described herein may be distributed across various portions of computing infrastructure 110 as would be appreciated.

In some embodiments, computing infrastructure 110 may also include session database 112 for storing information regarding users, computing devices 102a-102n, data connections, elements 150a-150n, security attributes, security contexts, security scores, security profile definitions, and/or other data. In some embodiments, session database 112 may be, include, or interface to, for example, an Oracle™ relational database sold commercially by Oracle Corporation. Other databases, such as Informix™, DB2 (Database 2) or other data storage or query formats, platforms, or resources such as OLAP (On Line Analytical Processing), SQL (Standard Language Query), a SAN (storage area network), Microsoft Access™ or others may also be used, incorporated, or accessed into the invention. Session database 112 may include any combination of databases, memory only data stores, or other data storage devices.

Figure 2:
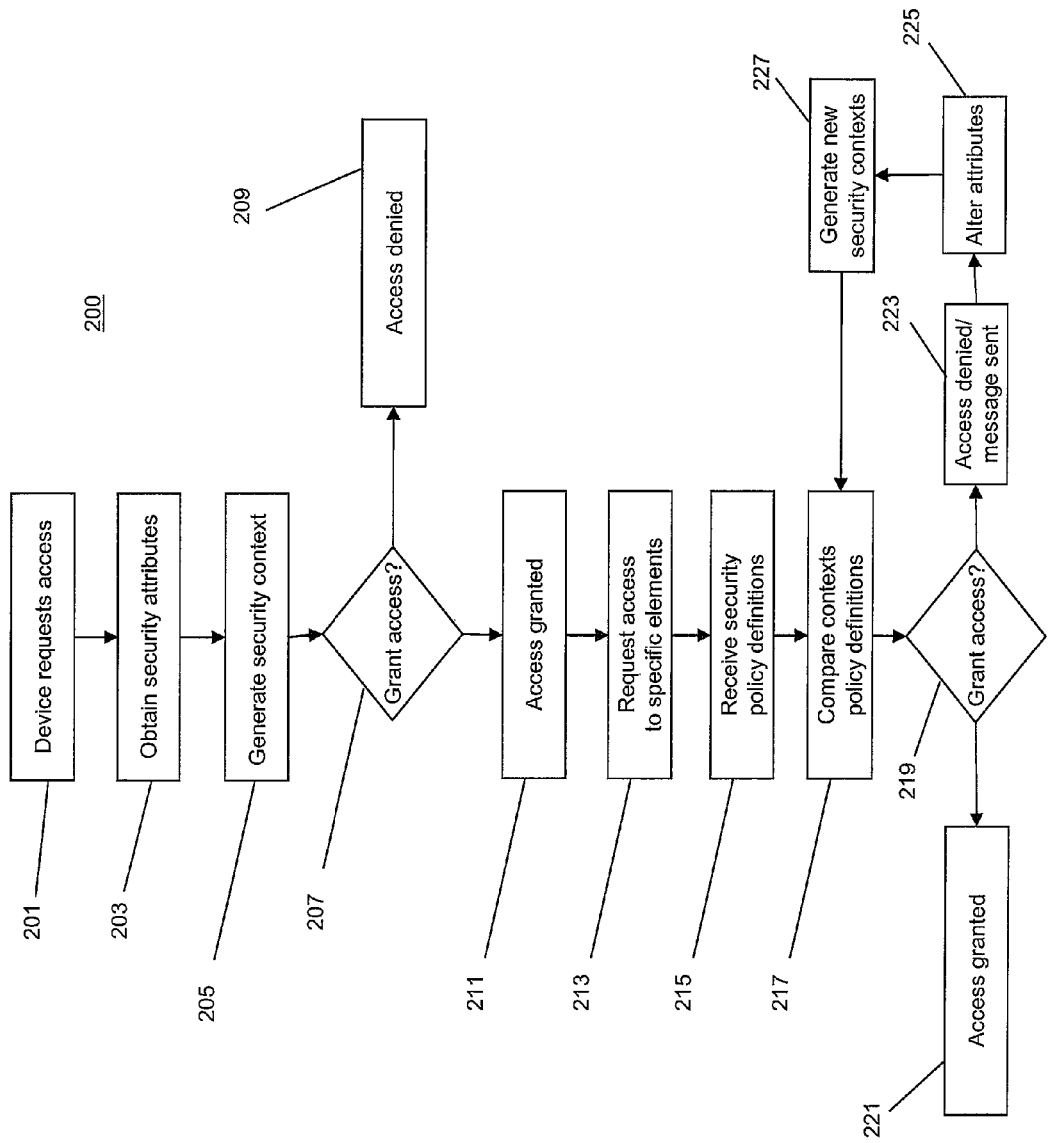
FIG. 2 illustrates an example of a process for providing multi-context policy management according to various embodiments of the invention.

In some embodiments, the invention may enable multi-context policy management in a computing infrastructure (e.g., computing infrastructure 110) that includes shared security information regarding a plurality of security contexts, wherein access is gated based on the shared security information. FIG. 2 illustrates a process 200, which is an example of a process for multi-context policy management according to various embodiments of the invention. The various operations of process 200 are described as they would operate in environment 100 illustrated in FIG. 1. However, those having skill in the art would recognize that the various features and functions of process 200 may be performed in environments having alternative configurations.

In some embodiments, process 200 may include an operation 201, wherein a computing device 102 may submit a request to access computing infrastructure 110. In some embodiments, this access request may be a general access request to enter computing infrastructure 110 and need not be a request for access to a specific element 150 of computing infrastructure 110. In some embodiments, the invention may involve single access requests that identify computing infrastructure 110 generally and a specific element 150 thereof for access by a requesting computing device 102.

In some embodiments, the one or more potential security threats posed by an access request from a particular computing device 102 may be assessed by the system of the invention. In an operation 203, attribute reception module 120 may request, determine, or otherwise obtain one or more security attributes of computing device 102 and store these attributes in session database 112. In some embodiments, the one or more security attributes may be obtained when attribute reception module 120 "interrogates" the requesting computing device 102 for these attributes. Other methods of obtaining security attributes may be used.

In some embodiments, the one or more security attributes may include device-based security attributes, user-based security attributes, connection-based security attributes, and/or other types of security attributes. In some embodiments, device based security attributes, user-based security attributes, and connection-based security attributes may be referred to as "communication-related security attributes" as each of these types of attributes relate to the communication between the device and communication infrastructure 110 or elements 150a-150n thereof.

In some embodiments, device-based security attributes may be attributes inherent to the requesting computing device that may be related to one or more potential security threats posed by computing device 102 to computing infrastructure 110 or elements 150 thereof. For example, the one or more device-based security attributes may include an indication of whether anti-virus software is installed on computing device 102, whether device 102 is recognized as being issued by the enterprise or other organization operating computing infrastructure 110, and/or other security attributes.

User-based security attributes may include attributes inherent to a user of the computing device 102 that may be relevant to the security of computing infrastructure 110 or elements 150 thereof. For example, user-based security attributes may include the identity (or purported identity) of a user of the computing device 102 and/or any attributes associated with the user (e.g., title, permission-related information, or other attributes). In some embodiments, user-based attributes may be extracted from "login" information provided by a user such as, for example, a username, password, and/or other login information. The login information may be obtained by presenting the user with graphical user interface at the computing device 102 prompting the user to enter the login information. In some embodiments, login information may used to retrieve other user-based attributes from within computing infrastructure 110 or elsewhere. For example, the username from a login may be used to retrieve job-title, permission information, or other information stored within computing infrastructure. In some embodiments, user-based attributes may be based on the strength of authentication technology used to establish identity. For example, access to a low-value resource may require a less-secure authentication methods such as, for example, user name and password, while higher-value resources may require a more secure authentication type such as, for example, a multi-factor mechanism using digital certificates or biometrics.

Connection-based security attributes may include attributes inherent to the data connection between the computing device 102 and computing infrastructure 110 that may be relevant to the security of computing infrastructure 110 or elements 150 thereof. For example, connection-based security attributes may include the identity of the network protocol that is used to access computing infrastructure 110 (e.g., whether communication is secured). In a further example, connection-based security attributes may include security attributes of network 104 (or portions thereof) used by computing device 102 to access computing infrastructure 110. The one or more network security attributes of network 104 may include attributes such as, for example, whether computing device 102 is physically connected to a secure network, whether computing device 102 has accessed the network via a VPN, whether the network is or includes a secured wireless area network, whether the network is or includes a Local Area Network, and/or other attributes. Other attributes may be considered or used as connection-based attributes.

In an operation 205, security context module 122 may use the one or more security attributes to generate one or more security contexts for computing device 102 and store the context in session database 112. In some embodiments, a single security context may be generated for each type of security attributes obtained in operation 203. For example, device-based security attributes may be used to generate a device-based security context, user-based security attributes may be used to generate a user-based security context, and connection-connection based security attributes may be used to generate a connection-based security context. Other security contexts may also be generated using other security attributes. In some embodiments, the one or more security contexts may be normalized, such that they may be consumed or otherwise utilized across computing system 110. For example, in some embodiments, one or more security contexts may be generated in a standardized format using normalized values as would be appreciated by those skilled in the art so as to be more easily utilized by the various components of computing infrastructure 110.

In some embodiments, generating a security context may include generating a security score. The security score may be stored in session database 112. In some embodiments, the security score may be an indicator of a relative strength of the overall security posture of the communication between a computing device 102 and computing infrastructure 110. In some embodiments, the security score may be based at least in part on the one or more security attributes. In some embodiments, the security score may be generated for each of the plurality of security contexts. For example, the user-based security context, the connection-based security context, the device-based security context, and/or other contexts may each be associated with a security score based on their respective security attributes. Accordingly, the various components of computing infrastructure 110, for example, may have access to multiple security scores related to the communication between a given computing device 102 and communication infrastructure 110. It should be noted that the security score may be generated for each of the plurality of security contexts based on any other security attributes and/or data. In some embodiments, the security context may comprise the generated security score.

In some embodiments, the security score may be represented as a set of numbers, the cardinality of which reflects the level of security threat. For example, 0, 1, and 2 may indicate low, medium, and high levels of security respectively. In some embodiments, the security score may be or include any arbitrary set of numbers. In some embodiments, the security score may be represented as a proportional (or fractional) number. The proportional security score may range from 0 to 1, wherein, for example, 0 represents insecure, 1 indicates fully secure, and fractions in between represent a fractional level of security as compared to 1. In some embodiments, the security score may be represented as letters, combination of letters, and/or words. For example, the security score of "F," "C," and "A" may indicate a low, medium, and high level of security, respectively. In another example, the words "low," "medium," and "high" may indicate low, medium, and high levels of security.

In some embodiments, a "veto security score" may be generated. The veto security score may indicate an especially vulnerable component within a context. For example, a device 102 that has no installed anti-virus software and is running an outdated operating system may receive a veto security score. The veto security score may be represented using any value using any representation method. In some embodiments, when present, the veto security score may prevent access to a given element 150, even if other security contexts receive acceptable, or even high security scores.

In some embodiments, the generated security scores for each of the plurality of security contexts may be aggregated to generate an aggregate security score. The aggregate security score may represent the overall threat level posed by the combination of the plurality of security contexts and access to elements 150a-150n may be gated thereupon. Other methods of representing security scores may be used as would be appreciated by those skilled in the art. Furthermore, although generally described as a range of values, the security score may use a scoring system that combines different types of score representations (e.g., using both letters and numbers to represent the security score) and/or any other scoring system.

In some embodiments, general access to computing infrastructure 110 may be gated by network access element 106, which may be responsible for communication to and from the requesting computing device 102, including passing information requests, obtaining security attributes and/or other communications.

In an operation 207, the requesting computing device 102 may be either granted or denied access to computing infrastructure 110. In some embodiments, an access module 124 may determine whether access is granted to computing infrastructure 110. In some embodiments, one or more general access policy definitions may be used by access module 124 to determine whether to grant access to computing infrastructure. For example, the general access policies that specify certain requirements that must be met for a computing device 102 to be granted access to computing infrastructure 110 may be stored in session database 112 or other portion of computing infrastructure 110. In some embodiments, one or more of the generated security contexts and/or information related thereto may be applied to or compared with the general access policies by access module 124 to gate general access to computing infrastructure 110. In some embodiments, only a portion of the security contexts or related information (e.g., login information) may be used to gate access to computing infrastructure.

If the requesting computing device 102 is not granted access to computing infrastructure, process 200 proceeds to an operation 209 wherein an access denial message may be sent to the requesting computing device 102. If the requesting computing device 102 is granted access to computing infrastructure, process 200 proceeds to an operation 211 wherein a data connection between the computing device 102 and computing infrastructure 110 may be established.

In an operation 213, a computing device 102 that is connected to computing infrastructure 110 may request access to one or more specific elements 150 of computing infrastructure 110. In an operation 215, one or more security policy definitions regarding the one or more elements 150 for which access has been requested by the computing device 102 may be received, determined, or otherwise obtained by, for example, an element policy module 126. For example, in some embodiments, session database 112 or other portion of computing infrastructure 110 may store and/or manage the individual security policies regarding each of the elements 150a-150n of computing infrastructure 110. In some embodiments, these security policies may define specific conditions (e.g., security policy definitions), for access to each element 150 of computing infrastructure 110. In some embodiments, the specific conditions may include conditions related to one or more of a plurality of security contexts such as, for example, a device-based security context (i.e., what device-inherent attributes must or must not be present to grant access), a user-based security context (i.e., what user-inherent attributes must or must not be present to grant access), a connection-based security context (i.e., what connection-inherent attributes must or must not be present to grant access), and/or other security contexts.

In some embodiments, the specific conditions may be or include security score requirements. In some embodiments, the security score requirements may specify that each of the one or more security contexts complies with a minimum security score. For example, the security policy of an element 150 may specify that access may be granted to element 150 only when user-based, device-based, and/or connection-based security scores are each above a minimum security score value. In some embodiments, the one or more security score requirements may specify that at least one of the one or more security contexts complies with a minimum security score. In some embodiments, the security score requirements may specify that access be denied when one or more veto security scores exist in the one or more security contexts.

In some embodiments, the security policy of each element 150 may specify the "level" of access that is to be granted to each acceptable combination of security context information (i.e., the attributes, scores, or other information associated with the security contexts). This may be referred to as the "application-based security context" that is used in granted access. However, unlike the device-based security context, the user-based security context, and the connection-based security context, which are all derived between the communication between a computing device and computing infrastructure 110, the application-based security context is derived from the security policies of individual elements 150. The "level" of access dictated by the application-based security context may refer to the functions or features of an element 150 made available to a computing device 102 during communication with the element 150. For example, a given element 150 may grant only partial access to certain users, those using certain types of devices, those connected via certain types of connections, and/or some combination thereof. In one example, if the elements 150a-150n included a sales portal application by which sales persons of an enterprise may place orders for product, the actual number of products that can be ordered using the sales portal application may be limited based upon the security contexts of a given communication between a computing device 102 and the sales portal application. For instance, orders placed via a VPN connection to communication infrastructure 110 may be limited to 10,000 units (or other predetermined limit), while orders placed from a communication device operating directly on a LAN connection of computing infrastructure 110 may not be so limited. In some embodiments, application-based security context information may be included in the one or more security policy definitions obtained by element policy module 126.

In some embodiments, the security policy definitions for a given element 150 may define multiple sets of conditions, wherein each set of conditions provide a different level or "type" of access to the element 150. In some embodiments, each set of conditions may specify the attributes of one or more security contexts that must be present (or not present) to allow the specific level or type of access associated with that set of conditions. In some embodiments, each set of conditions may specify one or more security scores associated with one or more security contexts that must be present (or not present) to allow the specific level or type of access associated with that set of conditions. In the example given above regarding a sales portal application, the application may include a first set of conditions for enabling orders of 10,000 units or less, and a second set of conditions for orders of an unlimited number of units.

In an operation 217, access module 124 may compare at least one of the communication-related security contexts to the security policy definitions for the element 150 to determine whether they meet the conditions for access set forth by the security policy of the element 150. In some embodiments, multiple communication-related security contexts (e.g., two or more of a user based security context, a device-based security context, or a connection-based security context) may be compared to the security policy definitions of an element 150 for the purpose of access gating. The use of multiple contexts in access gating may provide more robust and effective security access management.

If, in an operation 219, the requirements of the one or more security policy definitions of an element 150 are met, process 200 proceeds to an operation 221, wherein the computing device 102 is granted access to the element 150. In some embodiments, the level of access granted to computing device 102 may be granted according to the specific application-based security context associated with the element 150 for the specific combination of communication-related security attributes.

If, in operation 219, the conditions are not met, access is denied in an operation 225. In other words, although the computing device 102 may comply with a security policy to grant access to computing infrastructure 110, the computing device 102 may not comply with the specific security policy of the element 150 for which access was requested. Accordingly, the one or more elements of computing infrastructure 110 that deny the request may require an altered security "posture" of computing device 102 before access may be granted.

In some embodiments, upon denial of access to the at least one element 150 in operation 223, one or more remediation messages may be sent to the computing device 102. In some embodiments, the one or more remediation messages may be formulated and/or sent by a remediation message module 128. Remediation messages may comprise messages that notify the computing device 102 to alter its security posture prior to further access requests. In some embodiments, the one or more remediation messages may comprise a message to, for example, update or activate anti-virus protection, resubmit over a secure connection, change networks, and/or other messages. In some embodiments, the one or more remediation messages may include an instruction to increase an authentication level by re-challenging the user with more secure authentication methods. For example, access to a low-value resource may require a less-secure authentication methods such as, for example, user name and password, while higher-value resources may require a more secure authentication type such as, for example, a multi-factor mechanism using digital certificates or biometrics. The security posture of the computing device 102 may then be altered according to the instructions of the one or more remediation messages.

In an operation 225, the security attributes of the computing device 102 may be altered according to the instructions of the one or more remediation messages. In some embodiments, computing device 102 may be pre-programmed to receive the one or more remediation messages and automatically react accordingly. In some embodiments, computing device 102 may relay the one or more remediation messages to a user of computing device 102 (e.g., via a graphical user interface) whereupon the user may direct the altering of security attributes. Altering of security attributes of operation 225 may include altering one or more device-based security attributes, one or more user-based security attributes, one or more connection based security attributes, and/or one or more other security attributes.

After one or more security attributes have been altered, process 200 may proceed to an operation 227, wherein security context module 122 may generate new security contexts according to the one or more altered security attributes. Process 200 may then proceed to operation 217 wherein the new security contexts may be compared to the security policy definitions of the one or more elements 150 to which access has been requested.

While operation 203 discusses obtaining security attributes of multiple types (e.g, device, user, and connection-based attributes) and operation 205 discussed generating security contexts of multiple types (e.g., device, user, and connection-based) at a certain point in process 200, it should be understood that different types of security attributes and/or security contexts may be obtained and/or generated at different points in process 200. Furthermore, it should be understood that general access to computing infrastructure 110 may be gated using other mechanisms known in the art, and need not include the use of multiple security contexts. Furthermore, it should be understood that while at least one communication-related security context may be compared to the security policy definitions for a given element 150 to determine access, that two or more communication based security contexts may be compared to the security policy definitions of a given element 150 to provide a more robust and layered security gating mechanism.

Implementations of the invention including any modules described herein may be made in hardware, firmware, software, or any suitable combination thereof. The invention, including any features, functions, or operations of any methods or processes described herein, may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

While the invention includes methods or processes and the operations thereof described in a particular order, those having skill in the art will recognize that the order of operations may be varied. In some embodiments, some operations may be combined or separated. In some embodiments, not all operations may be necessary. In some embodiments, additional operations may be used.

Those having skill in the art will appreciate that the invention described herein may work with various system configurations. Accordingly, more or less of the aforementioned system components may be used and/or combined in various embodiments. It should also be understood that various software modules described herein that are utilized to accomplish the functionalities described herein may be maintained on one or more of network access element 106, one or more elements 150a-150n, or other part of computing infrastructure 110, as necessary. In some embodiments, the features and functions of the various modules described herein may be separated and or combined in different configurations.

Although modules 120-128 are shown to reside on server 114, modules 120-128 may exist in other configurations. In particular, each of modules 120-128 may reside on or be associated with at least one element 150. In this configuration, a plurality of each of modules 120-128 may be used. Thus, instead of being performed on one or more centralized servers, the functions of the modules 120-128 may be performed by or in association with element 150 or other components of computing infrastructure 110. For example, although a single security context module 122 is shown and discussed, a plurality of security context modules 122 may be used. Each of the plurality of security context modules 122 may be associated with at least one element 150. In this configuration, each element 150 may generate its own security context using a security context module 122 that is associated with the element. Similarly, a plurality of access modules 124 may be used, each associated with at least one element 150. In this configuration, each element 150 may gate access according to its own security policy. It should be understood that any combination of configurations may be used as would be appreciated by those skilled in the art. In embodiments wherein certain functions and or decision-making (e.g., context generation and/or element access decisions) is distributed to the individual elements 150-150n or otherwise decentralized, the use of "normalized" security contexts may be useful such that a security context may be utilized by a plurality of elements 150 across computing infrastructure 110.

In some embodiments, not all modules may be necessary. In some embodiments, additional modules may be used. In some embodiments, as would be appreciated, the functionalities described herein may be implemented in various combinations of hardware and/or firmware, in addition to, or instead of, software.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method for multi-context policy management, comprising:

generating multiple security contexts relating to a computing device communicating with a networked computing infrastructure, wherein the multiple security contexts include a first security context based on one or more first security attributes relating to the computing device communicating with the computing infrastructure and a second security context based on one or more second security attributes relating to the computing device communicating with the computing infrastructure;

receiving a request to access one or more elements in the computing infrastructure from the computing device;

receiving one or more security policy definitions that define one or more conditions associated with accessing the one or more elements in the computing infrastructure;

determining whether to grant the computing device access to the one or more elements in the computing infrastructure based on the first security context, the second security context, and the one or more security policy definitions; and sending a response indicating that the computing device has not been granted the requested access to the one or more elements in the computing infrastructure, wherein the response includes one or more remediation messages that instruct the computing device to alter anti-virus protection associated with the computing device or increase an authentication level associated with the computing device by re-challenging a user with one or more secure authentication methods prior to any further requests to access the one or more elements.

2. The method of claim 1, wherein the one or more security policy definitions specify an access level to grant computing devices meeting the one or more defined conditions.

3. The method of claim 1, wherein the one or more elements associated with the requested access include a software application and the one or more security policy definitions specify different access levels to grant computing devices having different security attribute combinations used to generate one or more of the first security context or the second security context.

4. The method of claim 1, wherein the first security context includes a first security score relating to the computing device communicating with the computing infrastructure and the second security context includes a second security score relating to the computing device communicating with the computing infrastructure.

5. The method of claim 1, wherein determining whether to grant the computing device access to the one or more elements comprises using the first security context and the second security context to generate a normalized aggregate security score and comparing the normalized aggregate security score to the one or more security policy definitions.

6. The method of claim 1, wherein the one or more first security attributes or the one or more second security attributes provide a user-based security context that relates to characteristics associated with the user.

7. The method of claim 1, wherein the one or more first security attributes or the one or more second security attributes provide a connection-based security context that relates to characteristics associated with a data connection between the computing device and the computing infrastructure.

8. The method of claim 1, wherein the one or more first security attributes or the one or more second security attributes provide a device-based security context that relates to characteristics associated with the computing device.

9. The method of claim 1, wherein determining whether to grant the computing device access to the one or more elements includes generating the response indicating that the requested access has not been granted in response to either the first security context or the second security context failing to comply with the one or more security policy definitions.

10. The method of claim 1, wherein determining whether to grant the computing device access to the one or more elements, includes granting the computing device access to the one or more elements in response to the first security context and the second security context complying with the one or more security policy definitions.

11. The method of claim 1, further comprising updating one or more of the first security context or the second security context in response to determining that the computing device has an altered security posture indicating that the computing device has complied with the one or more remediation instructions.

12. The method of claim 11, further comprising:
receiving a further request to access the one or more elements in the computing infrastructure from the computing device; and
determining whether to grant the computing device access to the one or more elements in the computing infrastructure based on the altered security posture and the one or more security policy definitions, wherein the altered security posture includes the updated first or second security context.

13. A method for multi-context security policy management in a networked computing infrastructure, the networked computing infrastructure having one or more elements, the method comprising:
generating a device-based security context based at least in part on one or more device-based security attributes regarding a computing device in communication with the computing infrastructure;
generating a user-based security context based at least in part on one or more user-based security attributes regarding an identified user of the computing device;
generating a connection-based security context based at least in part on one or more connection-based security attributes regarding the data connection between the computing device and the computing infrastructure;
receiving a request from the computing device for access to at least one of the one or more elements of the computing infrastructure;
receiving one or more security policy definitions for the at least one of the one or more elements, wherein the one or more security policy definitions define one or more sets of conditions for access to the at least one of the one of the one or more elements, each set of conditions including specified device-based attributes, user-based attributes, and connection based attributes, wherein for each set of conditions, the level of access to be granted to the at least one element is defined; and
determining whether to grant the computing device access to the at least one of one or more elements based on the device-based security context, the user-based security context, the connection-based security context, and the one or more security policy definitions of the at least one of the one or more elements.

14. A system for multi-context policy management, comprising:
a networked computing infrastructure having one or more processing devices;
a security context module configured to run on the one or more processing devices and generate multiple security contexts relating to a computing device communicating with the computing infrastructure, wherein the multiple security contexts include a first security context based on one or more first security attributes relating to the computing device communicating with the computing infrastructure and a second security context based on one or more second security attributes relating to the computing device communicating with the computing infrastructure;
an element policy module configured to run on the one or more processing devices, receive a request to access one or more elements in the computing infrastructure from the computing device, and receive one or more security policy definitions that define one or more conditions associated with accessing the one or more elements in the computing infrastructure;
an access module configured to run on the one or more processing devices and determine whether to grant the computing device access to the one or more elements in the computing infrastructure based on the first security context, the second security context, and the one or more security policy definitions; and
a remediation message module configured to run on the one or more processing devices and send a response having one or more remediation messages that instruct the computing device to alter a security posture prior to further requesting access to the one or more elements in response to the access module not granting the computing device access to the one or more elements, wherein the security context module is further configured to update one or more of the first security context or the second security context in response to determining that the computing device has altered the security posture to comply with the one or more remediation instructions.

15. The system of claim 14, wherein the at least one of the one or more elements associated with the requested access include a software application and the one or more security policy definitions specify different levels access levels to grant computing devices having different security attribute combinations used to generate one or more of the first security context or the second security context.

16. The system of claim 14, wherein the first security context includes of a first security score relating to the computing device communicating with the computing infrastructure and the second security context includes a second security score relating to the computing device communicating with the computing infrastructure.

17. The system of claim 14, wherein to determine whether to grant the computing device access to the one or more elements, the access module is further configured to use the first security context and the second security context to generate a normalized aggregate security score and compare the normalized aggregate security score to the one or more security policy definitions.

18. The system of claim 14, wherein the one or more first security attributes or the one or more second security attributes a user-based security context that relates to characteristics associated with a user.

19. The system of claim 14, wherein the one or more first security attributes or the one or more second security attributes provide a connection-based security context that relates to characteristics associated with a data connection between the computing device and the computing infrastructure.

20. The system of claim 14, wherein the one or more first security attributes or the one or more second security attributes provide a device-based security context that relates to characteristics associated with the computing device.

21. The system of claim 14, wherein the access module is further configured to generate the response indicating that the requested access has not been granted in response to either the first security context or the second security context failing to comply with the one or more security policy definitions.

22. The system of claim 14, wherein the access module is further configured to grant the computing device access to the one or more elements in response to the first security context and the second security context complying with the one or more security policy definitions.

23. The system of claim 14, wherein the element policy module is further configured to receive a further request to access the one or more elements in the computing infrastructure from the computing device, the access module is further configured to determine whether to grant the computing device access to the one of one or more elements in the computing infrastructure based on the altered security posture, and the altered security posture includes the updated first or second security context.

* * * * *